(12) United States Patent
Miche

(10) Patent No.: US 9,617,405 B2
(45) Date of Patent: Apr. 11, 2017

(54) CLOSURE AND LINER COMPOSITIONS ESSENTIALLY FREE OF ETHYLENE VINYL ACETATE COPOLYMER

(75) Inventor: Stephane Miche, Barecelona (ES)

(73) Assignee: Closure Systems International Inc., Lake Forest, IL (US)

( * ) Notice: Subject to any disclaimer, the term of this patent is extended or adjusted under 35 U.S.C. 154(b) by 356 days.

(21) Appl. No.: 13/980,646

(22) PCT Filed: Jan. 26, 2012

(86) PCT No.: PCT/US2012/022647
§ 371 (c)(1),
(2), (4) Date: Sep. 4, 2013

(87) PCT Pub. No.: WO2012/103283
PCT Pub. Date: Aug. 2, 2012

(65) Prior Publication Data
US 2014/0014656 A1    Jan. 16, 2014

Related U.S. Application Data

(60) Provisional application No. 61/437,336, filed on Jan. 28, 2011.

(51) Int. Cl.
*B32B 1/02* (2006.01)
*C08L 23/06* (2006.01)
*B65D 51/00* (2006.01)
*B32B 1/08* (2006.01)

(52) U.S. Cl.
CPC .............. *C08L 23/06* (2013.01); *B65D 51/00* (2013.01)

(58) Field of Classification Search
CPC ..... Y10T 428/1352; B32B 1/02; C08L 23/06; B65D 51/00
USPC .................... 428/34.1, 34.2, 35.7, 35.9, 36.9
IPC ..................................................... B65D 51/00
See application file for complete search history.

(56) References Cited

U.S. PATENT DOCUMENTS

| | | | | |
|---|---|---|---|---|
| 4,556,152 A * | 12/1985 | Bogren | ................ | B65D 3/268 220/270 |
| 6,706,389 B1 | 3/2004 | Bates et al. | | |
| 2003/0213938 A1* | 11/2003 | Farley | ................ | C08L 23/0815 252/500 |
| 2003/0215591 A1 | 11/2003 | Inoue et al. | | |
| 2006/0211819 A1* | 9/2006 | Hoenig | ............... | C08L 23/0815 525/88 |

FOREIGN PATENT DOCUMENTS

| | | | |
|---|---|---|---|
| GB | 995591 | * | 6/1965 |
| JP | 2005163389 | | 6/1993 |
| JP | 2001323119 A | | 11/2001 |
| JP | 06021368 A | * | 1/2006 |
| JP | 2009007575 | | 1/2009 |
| RU | 2179563 | | 2/2002 |
| WO | 9733935 | | 9/1997 |
| WO | 2008/026106 A2 | | 3/2008 |

OTHER PUBLICATIONS

Supplementary European Search Report for corresponding application No. EP 12 73 9020 mailed May 21, 2014.

* cited by examiner

*Primary Examiner* — Marc A Patterson
(74) *Attorney, Agent, or Firm* — Nixon Peabody LLP

(57) ABSTRACT

The invention provides liner resin compositions which are essentially free of ethylene vinyl alcohol (EVA) copolymer and molded plastic closures which include the described liner resin compositions. Instead of EVA copolymers, the provided liner resin compositions generally include low density polyethylene (LDPE). Accordingly, in one embodiment, the invention provides a liner resin composition comprising: a) LDPE; b) metallocene-catalyzed very low density polyethylene; c) a random copolymer; and d) a lubricant; wherein said liner composition is essentially free of EVA copolymer.

15 Claims, No Drawings

CLOSURE AND LINER COMPOSITIONS ESSENTIALLY FREE OF ETHYLENE VINYL ACETATE COPOLYMER

FIELD OF THE INVENTION

The present invention is generally related to liner resin compositions for closures, and more particularly to liner compositions which are essentially free of ethylene vinyl acetate (EVA) copolymer. The present invention is also related to compression molded plastic closures which include the described liner resin compositions.

BACKGROUND OF THE INVENTION

Compression and injection molded plastic closures are widely used in the marketplace on associated containers, including both carbonated and non-carbonated beverages. Compression molded sealing liners, as well as pre-formed insertible liners, are commonly put in place in the closure after the closure has been formed. U.S. Pat. Nos. 4,807,772 and 4,846,362 disclose liner compositions made of a blend of polyethylene or polypropylene and thermoplastic elastomeric copolymer.

Conventional liner resin compositions typically contain significant amounts of ethylene vinyl acetate (EVA) copolymer. For example, U.S. Pat. No. 4,984,803 discloses a sealing liner wherein EVA comprises about 70% of the liner composition.

Conventional closure liners are also described in, for instance, U.S. Pat. No. 5,104,710, EP 0478109, EP 0599356, EP 0488491, and 0646158. The liners may be applied to the closure by any of the known methods, such as those described in, for example, U.S. Pat. No. 4,518,336, EP 207385, and U.S. Pat. No. 4,277,431. The disclosures of the above-mentioned patents are herein incorporated by reference in its entirety.

Experience has shown that there are certain drawbacks associated with using EVA-containing liner resin compositions. For example, EVA-containing liner resin compositions have a relatively narrow processing window which can result in high levels of molding defects, such as large/ballooning bubbles, flash, non-fills and the like. Also, resins that contain EVA copolymer may limit the molding speed at which liners are molded into closures. In addition, non-EVA liner resin compositions may reduce the amount of resin needed to form a functional liner.

Thus, there is a need for novel liner resin compositions without substantial amounts of EVA.

SUMMARY OF THE INVENTION

The present invention generally relates to liner resin compositions which are essentially free of ethylene vinyl acetate (EVA) copolymers, and to molded plastic closures which include the described liner resin compositions. Instead of EVA copolymers, the provided liner resin compositions generally include low density polyethylene (LDPE).

Accordingly, in one embodiment, the invention provides a liner resin composition comprising:
  a) LDPE;
  b) metallocene-catalyzed very low density polyethylene;
  c) a random copolymer; and
  d) a lubricant;
wherein said liner composition is essentially free of EVA copolymer.

In a preferred embodiment, the liner resin composition further comprises a colorant.

In another preferred embodiment, the random copolymer is a random polypropylene copolymer.

In a preferred embodiment, the lubricant is erucamide.

In another preferred embodiment, the invention provides a liner resin composition comprising between about 10% and about 20% of metallocene-catalyzed very low density polyethylene; between about 5% and about 10% of a random copolymer; about 1% of a lubricant; a colorant in an amount sufficient to achieve the desired color of the liner resin composition; and between about 60% and 70% of LDPE to bring the total percentage to 100%, wherein the amounts are based on the total weight of the liner resin composition.

In a more preferred embodiment, the invention provides a liner resin composition comprising between about 10% and about 20% of metallocene-catalyzed very low density polyethylene; between about 5% and about 10% of a random polypropylene copolymer; about 1% of erucamide; a colorant in an amount sufficient to achieve the desired color of the liner resin composition; and between about 60% and 70% of LDPE to bring the total percentage to 100%, wherein the amounts are based on the total weight of the liner resin composition.

In an even more preferred embodiment, the invention provides a liner resin composition comprising about 20% of metallocene-catalyzed very low density polyethylene; about 8% of a random polypropylene copolymer; about 1% of erucamide; a colorant in an amount sufficient to achieve the desired color of the liner resin composition; and about 70% of LDPE to bring the total percentage to 100%, wherein the amounts are based on the total weight of the liner resin composition.

In a preferred embodiment, the invention provides a three-component dry blend mixture of: a) LDPE; b) metallocene-catalyzed very low density polyethylene; and c) a masterbatch which comprises LDPE, a random copolymer, a lubricant, and, optionally, a colorant. The three components may be mixed together directly at the molding machine.

Other features and advantages of the present invention will become readily apparent from the following detailed description and the appended claims.

DETAILED DESCRIPTION OF THE INVENTION

The disclosed embodiments are exemplary embodiments of the inventive concepts disclosed herein. The present disclosure is to be considered as an exemplification of the invention, and is not intended to limit the invention to the specific embodiments disclosed herein.

Instead of EVA copolymers which are included in conventional liner resin compositions, the provided liner resin compositions generally include low density polyethylene (LDPE). However, a simple substitution of LDPE for EVA may not work properly, since the resin may exhibit insufficient processing and product performance behavior. Further, because of the incompatibility between polypropylene and polyethylene, there may be lack of adhesion between the liner and the closure shell.

A desirable low-cost workable product needs to meet some or all of the following requirements:
  a) low-cost components;
  b) adequate compatibility between the liner and the closure resin;

c) adequate physical properties to have adequate product performance without the need for mineral oil as a plasticizer; and d) adequate food contact/migration and organoleptic properties.

Further, because the liner resin compositions of the invention are essentially free of EVA, the overall fluidity of the liner resin needs to be significantly higher than that of the conventional EVA resins to reach the required pellet stability during molding.

It has been discovered that the provided liner resin compositions meet the desired requirements. In one embodiment, the invention provides a liner resin composition comprising:

a) low density polyethylene (LDPE);
b) metallocene-catalyzed very low density polyethylene;
c) a random copolymer; and
d) a lubricant;

wherein said liner composition is essentially free of EVA copolymer.

As used in this application, the term "essentially free" means that the compositions may not include more than trace amounts of EVA copolymer.

In a preferred embodiment, the liner resin composition further comprises a colorant.

Preferably, the liner resin compositions of the invention are essentially free of mineral oil.

In a preferred embodiment, LDPE has a melt flow index (MFI) (190° C./2.16 Kg) of between about 20 and about 30, and in a more preferred embodiment of between about 20 and about 25.

In a preferred embodiment, LDPE has a density of between about 0.914 and 0.917.

Generally, for the purposes of the invention, metallocene-catalyzed very low density polyethylene is used to plasticize LDPE to reach a sufficiently low modulus to ensure proper sealing performance. Thus, metallocene-catalyzed very low density polyethylene generally needs to be high-flow and low density to blend into the high-flow LDPE, to reduce the overall modulus of the blend, and to confer some adhesion between the liner and the closure shell.

In a preferred embodiment, metallocene-catalyzed very low density polyethylene has the MFI (190° C./2.16 Kg) of about 30.

In a preferred embodiment, metallocene-catalyzed very low density polyethylene has density of between about 0.880 and 0.885.

In another preferred embodiment, metallocene-catalyzed very low density polyethylene is octene copolymer.

Generally, there is no limitation on a random copolymer suitable for purposes of the present invention, as long as the random copolymer is essentially free of EVA copolymer. Some suitable random copolymers include, but are not limited to, ethylene, propylene, 1-butene, 2-methyl-1-butene, 3-methyl-1-butene, pentene, hexene, cyclohexene, 4-methyl-1-pentene, vinylcyclohexane, octene, norbornene and the like. Each of them can be used alone or in a combination. In a preferred embodiment, the random copolymer is a random polypropylene copolymer.

Preferably, the random polypropylene copolymer has a MFI (230° C./2.16 Kg) of between about 40 and about 45, and a density of between about 0.900 and 0.905.

The lubricant suitable for the purposes of the invention is selected from the group consisting of fatty acid amides, fatty acid esters, microcrystalline waxes, polyethylene glycols, primary amides, secondary amides, secondary bisamides, silicon, silicone oils and blends thereof. In a preferred embodiment, the lubricant is erucamide. In a more preferred embodiment, the erucamide is purified and of a refined grade.

In a preferred embodiment, the invention provides a three-component dry blend mixture of: a) LDPE; b) metallocene-catalyzed very low density polyethylene; and c) a masterbatch which comprises LDPE, the high flow copolymer, the lubricant, and, optionally, a colorant. The three components may be mixed together directly at the molding machine.

It is within a skill in the art to prepare the end product from the provided dry blend mixture. Generally, there is no limitation on the precise method of preparing the end product from the provided dry blend mixture.

In another preferred embodiment, the invention provides a liner resin composition comprising between about 10% and about 20% of metallocene-catalyzed very low density polyethylene; between about 5% and about 10% of a random copolymer; about 1% of a lubricant; a colorant in an amount sufficient to achieve the desired color of the liner resin composition; and between about 60% and 70% of LDPE to bring the total percentage to 100%, wherein the amounts are based on the total weight of the liner resin composition.

In a more preferred embodiment, the invention provides a liner resin composition comprising between about 10% and about 20% of metallocene-catalyzed very low density polyethylene; between about 5% and about 10% of a random polypropylene copolymer; about 1% of erucamide; a colorant in an amount sufficient to achieve the desired color of the liner resin composition; and between about 60% and 70% of LDPE to bring the total percentage to 100%, wherein the amounts are based on the total weight of the liner resin composition.

In an even more preferred embodiment, the invention provides a liner resin composition comprising about 20% of metallocene-catalyzed very low density polyethylene; about 8% of a random polypropylene copolymer; about 1% of erucamide; a colorant in an amount sufficient to achieve the desired color of the liner resin composition; and about 70% of LDPE to bring the total percentage to 100%, wherein the amounts are based on the total weight of the liner resin composition.

In some embodiments, the compositions of the invention may include other optional components which include, but are not limited to, pigments, antioxidants, stabilizers, UV stabilizers, UV absorbers, molecular sieves, hydrocarbon oils, phthalate ester plasticizers, epoxidized soybean oil, foaming agents, acrylic processing aides, fillers, nanocomposites, oxygen scavengers, aldehyde scavengers, anti-microbials, and flavor enhancing agents.

In another embodiment, the invention provides a closure which contains a liner resin composition of the invention. In a preferred embodiment, a liner is compression molded in the closure.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

The following examples are intended to illustrate the present invention and to teach one of ordinary skill in the art how to make and use the invention. They are not intended to be limiting in any way.

EXAMPLES

Example 1

Physical Testing of the Inventive Compositions

The inventive compositions were physically tested to determine their suitability for the intended use.

What is claimed is:

1. A liner resin composition comprising:
   a) between about 60% and about 70% of low density polyethylene (LDPE);
   b) between about 10% and about 30% of metallocene-catalyzed very low density polyethylene;
   c) between about 5% and about 10% of a random copolymer; and
   d) about 1% of a lubricant;
   wherein said liner resin composition is essentially free of ethylene vinyl acetate (EVA) copolymer; and wherein said amounts are based on the total weight of the liner resin composition.

2. The liner resin composition according to claim 1 further comprising a colorant.

3. The liner resin composition according to claim 1, wherein said liner resin composition is essentially free of a mineral oil.

4. The liner resin composition according to claim 1, wherein the random copolymer is a random polypropylene copolymer.

5. The liner resin composition according to claim 1, wherein said lubricant is erucamide.

6. The liner resin composition according to claim 2, wherein the amount of metallocene-catalyzed very low density polyethylene is between about 10% and about 30%; the amount of the random copolymer is between about 5% and about 10%; the amount of the lubricant is about 1%; the amount of the colorant is sufficient to achieve the desired color of the liner composition; and the amount of LDPE is between about 60% and about 70%, wherein said amounts are based on the total weight of the liner resin composition.

7. The liner resin composition according to claim 6, wherein the amount of metallocene-catalyzed very low density polyethylene is about 20%.

8. The liner resin composition according to claim 6, wherein the random copolymer is a random polypropylene copolymer.

9. The liner resin composition according to claim 8, wherein the amount of the random polypropylene copolymer is about 8%.

10. The liner resin composition according to claim 6, wherein the lubricant is erucamide.

11. The liner resin composition according to claim 1, wherein the liner resin composition is a dry blend mixture of:
    a) LDPE;
    b) metallocene-catalyzed very low density polyethylene; and
    c) a masterbatch, wherein said masterbatch comprises LDPE, the random copolymer, the lubricant, and, optionally, a colorant.

12. A finalized liner resin composition prepared from the liner resin composition according to claim 11.

13. The finalized resin composition according to claim 12, wherein the melt flow index of said finalized resin composition is between about 20 and about 25.

14. The liner resin composition according to claim 1, wherein said liner resin composition is molded into a closure.

15. A molded closure comprising the liner resin composition according to claim 1.

* * * * *